March 20, 1962 R. L. FISCHER ETAL 3,025,592
PHASE TRANSFORMATION BONDING OF METAL MEMBERS
Filed July 22, 1959

← Original Bond Line

WITNESSES.

INVENTORS
Robert L. Fischer, Ezekiel F. Losco &
Benjamin Lustman.
BY
ATTORNEY 3,025,592
PHASE TRANSFORMATION BONDING OF
METAL MEMBERS
Robert L. Fischer, Ezekiel F. Losco, and Benjamin Lustman, Pittsburgh, Pa., assignors to Westinghouse Electric Corporation, East Pittsburgh, Pa., a corporation of Pennsylvania
Filed July 22, 1959, Ser. No. 828,911
6 Claims. (Cl. 29—194)

This invention relates to the bonding of metal members and to articles of manufacture comprising the bonded metal members.

In particular, this invention relates to the metallurgical bonding of metal members selected from the group consisting of zirconium, titanium and base alloys thereof.

For some applications it is necessary to bond together metal members which consist of zirconium, titanium and base alloys of these metals. Brazing techniques have proved satisfactory for some applications; however, bonds formed by brazing have poor resistance to corrosive media, such as high temperature water, steam and the like. Further, the mechanical strength of these bonds is not adequate for many high temperature applications.

Other proposed bonding techniques require exceptionally high temperatures and pressures.

It is desirable to have available a method employing no extraneous brazing alloys or solders for bonding together metal members selected from the group consisting of zirconium, titanium and base alloys of these metals, which method requires only moderate temperatures and pressures and will provide a bond that is mechanically strong at elevated temperatures and is resistant to highly corrosive media.

The object of this invention is to provide a method for metallurgically bonding metal members selected from the group consisting of zirconium, base alloys of zirconium, titanium and base alloys of titanium by a phase transformation bonding process, which bond has good mechanical strength at elevated temperatures and good resistance to highly corrosive media.

Another object of this invention is to provide metallurgically bonded metal members selected from the group consisting or zirconium, base alloys of zirconium, titanium and base alloys of titanium by a phase transformation bonding process, which metallurgical bond has good mechanical strength at elevated temperatures and good resistance to corrosion.

Other objects of this invention will, in part, be obvious and will, in part, appear hereinafter.

Figure 1:
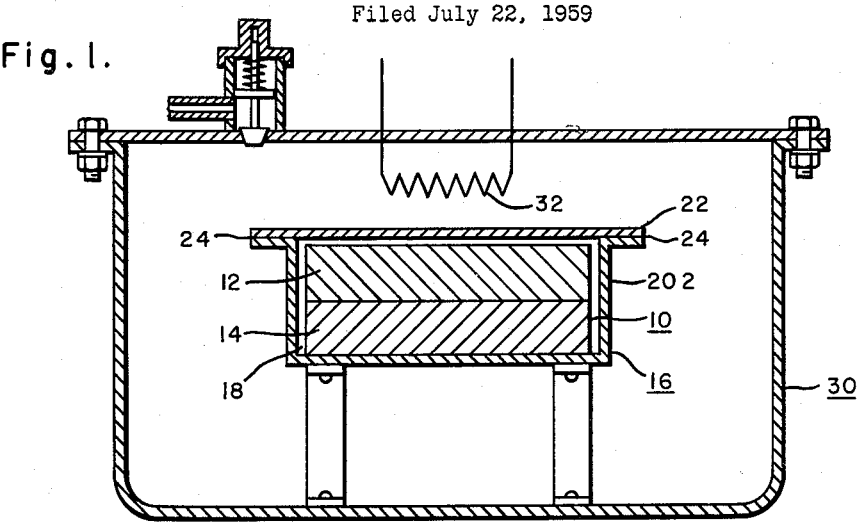
Figure 2:
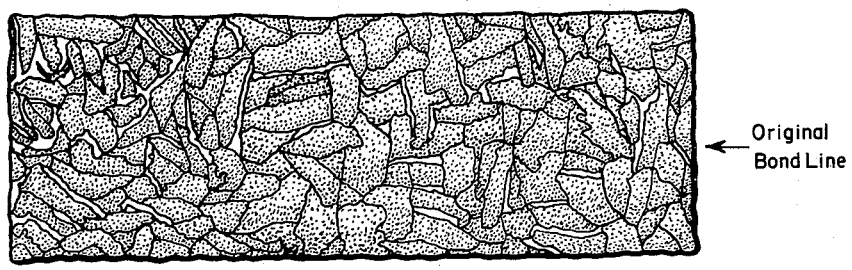

For a better understanding of the nature and the objects of this invention, reference should be had to the following detailed description and drawing, in which:

FIGURE 1 is a cross-sectional view of a stack of metal members encased in a flexible metal container; and FIG. 2 is a drawing taken from a photomicrograph taken at a magnification of 100 times of the cross section of two metal members metallurgically bonded in accordance with this invention and showing the bond interface of the members.

In accordance with this invention, it has been discovered that metal members selected from the group consisting of zirconium, base alloys of zirconium, titanium and base alloys of titanium can be satisfactorily bonded by a novel method employing phase transformation to form at the interfaces thereof, a strong metallurgical bond.

Briefly, in carrying out the method of this invention, the metal members to be bonded are first assembled in intimate contact with one another at the surfaces where bonding is to be effected and in the position in which they are to be united and heated at temperatures below alpha to beta transformation while under a moderate pressure, as will be hereinafter detailed. After such treatment while in intimate contact the contacting surfaces conform metallurgically to each other. The assembled metal members are then heated in an inert atmosphere at a temperature above the alpha to beta transformation temperature of the base metal for a relatively short period of time. At this last temperature, where the alpha phase transforms to the beta phase, the beta grains are forced to grow across the interface of the metallurgically contacting surfaces and the desired metallurgical bond is obtained.

In carrying out this invention, advantage is taken of the fact that the metals zirconium and titanium undergo alpha to beta transformation at a temperature substantially below the melting points of the metals.

This invention will be detailed hereinafter with reference to metal members as the members to be metallurgically bonded in accordance with this invention, and it is to be understood that the metal members are prepared from a metal selected from the group consisting of zirconium, base alloys of zirconium, titanium and base alloys of titanium.

For the purposes of this invention, it is important and critical that the members to be bonded be in intimate contact at the surfaces where bonding is to be effected before heating the members to effect transformation bonding thereof. If intimate contact is not insured, satisfactory bonding of the metal members will not be obtained.

To insure intimate contact of metal members prior to phase transformation bonding, the following described procedure is followed.

The surfaces of the metal members where bonding is to be effected are first cleaned in a suitable solvent such as trichloroethylene to remove dirt, oil, grease and the like therefrom.

The metal members are next assembled in the position in which they are to be bonded. The assembled metal members are heated to a temperature of from about 535° C. to 815° C. and subjected to pressure of the order of from about 1000 to 10,000 pounds per square inch for a period of time of from about 1 hour to 4 hours. The application of heat and pressure should be performed in such a manner as to avoid contamination of the metal members to be bonded. Thus, the application of heat and pressure is performed in an inert atmosphere such as a vacuum, or in an atmosphere of non-reactive or inert gas such as helium and argon. Any pressure means that make direct contact with the metal members are prepared from materials that will not contaminate the metal member when in contact therewith.

The simultaneous application of heat and pressure to the assembled metal members in order to effect an intimate contact between the contacting surfaces thereof prior to phase transformation bonding may be accomplished in the following described manner.

Referring to FIG. 1 of the drawing, there is shown assembly 10 comprising two metal members 12 and 14 to be subsequently bonded in accordance with this invention hermetically sealed within a flexible metal container 16 which has been evacuated so as to provide therein a pressure differential between chamber 18 and the exterior surfaces of the flexible metal container 16.

The flexible metal container 16 comprises a base portion 20 and a top portion 22. The metal members 12 and 14 are placed in the base portion 20 and the top portion 22 is placed in position. The assembly is then sealed by fusion welding the periphery 24 where base portion 20 and top portion 22 are in contact. The chamber 18 is evacuated by conventional well known methods such, for example, as employing an evacuation tube which leads to chamber 18. The evacuation tube, after evacuation, is sealed off.

It is preferred to prepare the portions 20 and 22 of the container 16 from flexible sheet steel because of its ease of handling, its ability to deform freely, its adaptability for folding, welding and its easy cutting properties. Thus, the container 16 can be easily and readily prepared, sealed and evacuated in accordance with the requirements of this invention.

The assembly 10 is placed in a suitable pressure vessel such as a high pressure, cold-wall autoclave 30 containing heating means 32. Gas pressure of the order of from about 1000 pounds per square inch to 10,000 pounds per square inch is created within the pressure vessel 30 and the assembly 10 is heated to a temperature of from about 535° C. to about 815° C. The pressure and heat are maintained for a period of time of from about 1 hour to 4 hours. The pressure created within the pressure vessel is applied to the exterior surfaces of the flexible metal container 16 and since chamber 18 is evacuated, and owing to the flexibility of the container 16, the pressure is thus applied to the exterior surfaces of metal members 10 and 12. The heat and pressure thus applied to the metal members provides for intimate contact of the metal members at the interface when metallurgical bonding is to be subsequently effected.

After intimate contact has been made between the contacting surfaces in the manner hereinbefore described, they conform to each other metallurgically and the assembly is then cooled to room temperature. The metal members, which are now in intimate contact at the surfaces where bonding is to be effected, may be removed from the flexible metal container and placed in a suitable furnace containing an inert atmosphere where transformation bonding is effected by heating the members to a temperature above the alpha to beta transformation temperature of the base metal and below the melting point thereof for a period of time of from about 5 minutes to 30 minutes. In some cases the flexible container with the metal members can be heated to the transformation temperature as a whole, and cooling to room temperature can be avoided.

Vacuum or inert gas atmospheres such as helium and argon are employed when heating the metal members in carrying out the steps of the method of this invention. Inert atmospheres are employed because of the high reactivity of zirconium, titanium and base alloys thereof with oxygen and like gases at elevated temperatures, which condition will adversely affect the physical properties of the bonded members. Thus, for example, oxygen absorbed by zirconium goes into solid solution and makes the metal permanently brittle.

The alpha to beta transformation temperature of zirconium is about 850° C. It has been determined that heating of zirconium and zirconium base alloys to a temperature of from about 900° C. to about 1000° C. will produce the desired metallurgical bonding in accordance with this invention.

The alpha to beta transformation temperature of titanium is about 883° C. Heating of titanium and titanium base alloys to a temperature of from about 900° C. to about 1000° C. will produce the desired metallurgical bonding in accordance with this invention.

In bonding together metal members in accordance with this invention, it is preferred that the members be of substantially the same composition. However, it is to be understood that this invention is not so limited. Thus, for example, a metal member prepared from zirconium can be satisfactorily bonded to a metal member prepared from titanium by the method of this invention.

The method of this invention has proved to be highly satisfactory for the bonding of metal members consisting of zirconium base alloys, such, for example, as those known as Zircaloy. Zirconium base alloys which may be bonded in accordance with this invention include those disclosed in U.S. Patent 2,772,964 which is assigned to the assignee of the present invention. Such alloys consist essentially of from 0.1% to 2.5% by weight of tin, a total of at least 0.1% but not exceeding 2% by weight of at least one metal from period III (and particularly, series IV) of the periodic table selected from the group consisting of iron, nickel and chromium, less than 0.5% by weight of incidental impurities, and the balance zirconium. However, other zirconium base alloys can be bonded by this method with highly satisfactory results. Thus, members of zirconium with up to 10% of beryllium, and zirconium with up to 10% tantalum and 10% niobium can be bonded by the process of this invention.

Examples of suitable titanium base alloys that can be employed in practicing this invention are given in Table I below.

TABLE I

*Composition Percent by Weight*

| Alloy | C | O | N | Al | Cr | Fe | Mn | Mo | Ti |
|---|---|---|---|---|---|---|---|---|---|
| 1 | 0.5 | | | 2 | | 2 | | | Bal. |
| 2 | 0.2 | trace | trace | 4 | | trace | 4 | | Bal. |
| 3 | 0.5 | | | 3 | 5 | | | | Bal. |
| 4 | 0.02 | 0.25 | 0.02 | | 2.7 | 1.3 | | | Bal. |
| 5 | 0.02 | trace | 0.02 | | 5 | 5 | | 5 | Bal. |

Referring to FIG. 2 of the drawing there is shown a drawing of a photomicrograph taken at a magnification of 100 times of a section of metal members bonded together in accordance with this invention. The metal members were prepared from a zirconium base alloy known as Zircaloy 2 consisting essentially of, by weight, about 1.5% tin, about 0.10% chromium, about 0.05% nickel, about 0.12% iron, the balance being zirconium and less than 0.5% by weight of incidental impurities. The arrow indicates the bond interface between the members.

The following example is illustrative of this invention:

EXAMPLE I

Two metal members, 2⅜ inches by 1½ inches by 80 mils are prepared from an alloy consisting essentially of, by weight, about 1.5% tin, 0.1% chromium, 0.05% nickel, about 0.12% iron, less than about 0.5% of impurities and the balance being zirconium. The members are cleaned in trichloroethylene to remove all dirt and grease from the surfaces thereof. The members are stacked one upon the other and sealed in a flexible steel container in the manner previously described to provide an assembly. The container is then evacuated and hermetically sealed so as to provide a vacuum within the container. The assembly is placed in a cold-wall autoclave containing heating means. The assembly is heated to about 550° C. and pressure of the order of about 5000 pounds per square inch is applied to the assembly for about 3 hours. The assembly is removed from the autoclave, cooled to room temperature and the stacked metal members removed. The stacked metal members, which now are in intimate contact with one another at the area where bonding is to be effected, are placed on a graphite boat and then placed in a vacuum furnace. The assembly is heated until the metal at the joint interface is at a temperature of about 1000° C., which requires about 60 minutes, and it is maintained at this temperature for about 5 minutes to effect transformation bonding of the metal members. The bonded metal members are cooled in the furnace to a temperature of about 400° C. The time required for the heated assembly to cool to this temperature is about two hours. The bonded metal members are then removed from the furnace and cooled to room temperature.

The alpha grain structure transformed to the beta grain structure during the application of heat and the beta grains grew across the original bond line and effecting the required metallurgical bond as indicated in FIG. 2 of the drawing. Test results have indicated that the metallurgical bond is substantially as strong as the zirconium metal itself.

It is to be understood that the above description and drawing are illustrative and not in limitation of the invention.

We claim as our invention:

1. The process of phase transformation bonding of metal members which undergo alpha to beta transformation selected from the group consisting of zirconium, titanium and base alloys thereof which comprises cleaning the surfaces to be bonded, placing the members in contact at the surfaces where the members are to be bonded to provide an assembly, heating the assembly in an inert atmosphere to a temperature of from about 535° C. to 815° C. while subjecting the assembly to pressure of the order of from about 1000 to 10,000 pounds per square inch for a period of time of from about 1 hour to 4 hours to cause the contacting surfaces to conform closely to each other and thereafter heating the assembly in an inert atmosphere to a temperature above the alpha to beta transformation temperature of the base metal and below the melting point thereof for at least 5 minutes whereby there is produced a strong metallurgical bond between the metal members without substantially altering the original dimensions of said members.

2. An article of manufacture comprising a bonded assembly of metal members which undergo alpha to beta transformation selected from the group consisting of zirconium, titanium and base alloys thereof metallurgically bonded together at the interface thereof, the bonded interface having the properties of the metals joined together and comprises beta grains grown across the joint, said article of manufacture being produced by the method of claim 1.

3. The process of transformation bonding of metal members which undergo alpha to beta transformation selected from the group consisting of zirconium, titanium and base alloys thereof which comprises cleaning the surfaces of the metal members where the metal members are to be bonded, placing the metal members in contact at the cleaned surfaces thereof to provide an assembly, hermetically sealing the assembly in an evacuated flexible metal container, heating the sealed assembly to a temperature of from about 535° C. to 815° C. while subjecting the sealed assembly to pressure of from about 1000 to 10,000 pounds per square inch for a period of time of from about 1 hour to 4 hours to cause the contacting surfaces to conform closely to each other, cooling the sealed assembly to room temperature, removing the assembly of metal members from the sealed container, and heating the assembly in an inert atmosphere to a temperature above the alpha to beta transformation temperature of the base metal and below the melting point thereof for a period of time of from about 5 minutes to 30 minutes whereby there is produced a strong metallurgical bond between the metal members without substantially altering the original dimensions of said members.

4. An article of manufacture comprising a bonded assembly of metal members which undergo alpha to beta transformation selected from the group consisting of zirconium, titanium and base alloys thereof metallurgically bonded together at the interface thereof the bonded interface having the properties of the metals joined together and comprises beta grains grown across the joint, said article of manufacture being produced by the method of claim 3.

5. In the method of transformation bonding metal members by an alloy consisting essentially of, by weight, from 0.1% to 2.5% of tin, and a total of at least 0.1% but not exceeding approximately 2% by weight of at least one metal from period III of the periodic table selected from the group consisting of iron, nickel and chromium, carbon not exceeding 0.05%, the balance being zirconium and less than 0.5% of incidental impurities, the steps comprising cleaning the surfaces to be bonded, placing the members in contact at the surfaces where the members are to be bonded to provide an assembly, heating the assembly in an inert atmosphere to a temperature of from about 535° C. to 815° C. while subjecting the assembly to pressure of the order of from about 1000 to 10,000 pounds per square inch for a period of time of from about 1 hour to 4 hours to cause the contacting surfaces to conform closely to each other, and heating the assembly in an inert atmosphere to a temperature of about from 900° C. to 1000° C. and above the alpha to beta transformation temperature of zirconium and below the melting point thereof for a period of time of from about 5 to 30 minutes whereby there is produced a strong metallurgical bond between the metal members without substantially altering the original dimensions of said members.

6. An article of manufacture comprising a bonded assembly of metal members of an alloy consisting essentially of, by weight, from 0.1% to 2.5% of tin, and a total of at least 0.1% but not exceeding approximately 2% of at least one metal from period III of the periodic table selected from the group consisting of iron, nickel and chromium, carbon not exceeding 0.05%, the balance being zirconium and less than 0.5% of incidental impurities, metallurgically bonded together at the interface thereof, the bonded interface having the properties of the metals joined together and comprises beta grains grown across the joint, said article of manufacture being produced by the method of claim 5.

References Cited in the file of this patent

UNITED STATES PATENTS

| | | |
|---|---|---|
| 2,691,815 | Boessenkool | Oct. 19, 1954 |
| 2,850,798 | Bowman | Sept. 9, 1958 |